United States Patent
Balistreri et al.

(10) Patent No.: US 11,345,193 B2
(45) Date of Patent: May 31, 2022

(54) WHEEL END ASSEMBLY WITH EXTERNAL ROTARY JOINT AND ROTARY JOINT VENTING MECHANISM

(71) Applicant: Dana Heavy Vehicle Systems Group, LLC, Maumee, OH (US)

(72) Inventors: Lucas A. Balistreri, Bowling Green, OH (US); Shad J. Falls, Perrysburg, OH (US); Jason M. Sidders, Perrysburg, OH (US); Steven G. Slesinski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 341 days.

(21) Appl. No.: 16/459,787

(22) Filed: Jul. 2, 2019

(65) Prior Publication Data
US 2020/0009924 A1   Jan. 9, 2020

Related U.S. Application Data

(60) Provisional application No. 62/693,859, filed on Jul. 3, 2018.

(51) Int. Cl.
   *B60C 23/00* (2006.01)

(52) U.S. Cl.
   CPC ...... *B60C 23/00345* (2020.05); *B60C 23/004* (2013.01); *B60C 23/0039* (2020.05); *B60C 23/00318* (2020.05); *B60C 23/00363* (2020.05); *B60C 23/009* (2013.01); *F16C 2326/02* (2013.01)

(58) Field of Classification Search
   CPC ... B60C 23/003; B60C 23/009; B60C 23/004; B60C 23/00327; B60C 23/0039; F16C 2326/02
   See application file for complete search history.

(56) References Cited

U.S. PATENT DOCUMENTS

| | | | |
|---|---|---|---|
| 1,016,896 A | 2/1912 | Rivers | |
| 2,107,405 A * | 2/1938 | Williams | .......... B60C 23/00318 152/417 |
| 3,982,225 A | 9/1976 | Schlanzky | |
| 4,387,931 A | 6/1983 | Bland | |
| 4,744,399 A | 5/1988 | Magnuson | |
| 5,287,906 A | 2/1994 | Stech | |
| 5,584,949 A * | 12/1996 | Ingram | ................. B60C 23/003 152/417 |
| 5,769,979 A | 6/1998 | Naedler | |
| 6,698,482 B2 | 3/2004 | Hennig | |

(Continued)

FOREIGN PATENT DOCUMENTS

EP   480855   4/1992

*Primary Examiner* — Scott A Browne
(74) *Attorney, Agent, or Firm* — McCoy Russell LLP

(57) ABSTRACT

A wheel end assembly for a tire pressure management system including an axle having an axle end portion and a rotary joint assembly disposed outboard of the axle end portion. The rotary joint has a rotary hub, a non-rotating tube spindle at least partially disposed within the rotary hub, the tube spindle having a tube spindle hollow central chamber, an air seal provided between the rotary hub and the tube spindle, and a bearing assembly provided between the rotary hub and the tube spindle. The bearing assembly is positioned outboard of the air seal.

14 Claims, 8 Drawing Sheets

(56) References Cited

U.S. PATENT DOCUMENTS

| | | | |
|---|---|---|---|
| 7,273,082 B2 | 9/2007 | White | |
| 7,306,020 B2 * | 12/2007 | Beverly | B60C 23/003 |
| | | | 152/415 |
| 7,963,159 B2 * | 6/2011 | Ingram | B60C 23/003 |
| | | | 73/146.3 |
| 8,132,607 B2 | 3/2012 | Kusunoki | |
| 8,505,600 B2 | 8/2013 | Padula | |
| 9,027,983 B2 | 5/2015 | Butler | |
| 9,283,818 B2 | 3/2016 | Keeney | |
| 9,346,330 B2 | 5/2016 | Musgrave | |
| 2012/0024445 A1 * | 2/2012 | Wilson | B60C 23/003 |
| | | | 152/415 |
| 2015/0239312 A1 | 8/2015 | Abukashef | |
| 2016/0152100 A1 | 6/2016 | Berkness | |
| 2016/0250901 A1 * | 9/2016 | Hennig | B60C 23/003 |
| | | | 152/417 |
| 2016/0288590 A1 * | 10/2016 | Hennig | B60C 23/003 |
| 2018/0072111 A1 * | 3/2018 | Cappello | B60C 23/003 |

* cited by examiner

WHEEL END ASSEMBLY WITH EXTERNAL ROTARY JOINT AND ROTARY JOINT VENTING MECHANISM

CROSS-REFERENCE TO RELATED APPLICATIONS

This present application claims priority to and the benefit of the filing date of the provisional patent application having Application No. 62/693,859 filed on Jul. 3, 2018, which is incorporated herein by reference in its entirety.

FIELD

The present disclosure relates to a wheel end assembly for use with a tire pressure management system for a vehicle. More particularly, the present disclosure relates to a wheel end assembly with an external rotary joint.

BACKGROUND

Tire pressure management systems for vehicles are used to provide a vehicle with the versatility to maneuver over differing terrain types and to reduce maintenance requirements. For example, a plurality of tires in fluid communication with a tire pressure management system may be at a pressure which can be lowered to provide additional traction for the vehicle or raised to reduce the rolling resistance and increase the fuel efficiency of the vehicle. Additionally, utilizing a tire pressure management system may eliminate the need to periodically check and adjust the pressure within each tire. However, tire pressure management systems are difficult to install on an axle due to the increased complexities associated therewith, spacing requirements, and associated costs.

In addition, because tire pressure management systems almost always involve pressurized fluid, having venting mechanisms in the system is important. In particular, rotary joint assemblies used with tire pressure management systems usually have a venting mechanism to allow pressurized air that escapes past the air seal to find a way to atmosphere that does not involve going through the bearing assembly. Pressurized air can destroy a bearing assembly and result in costly repairs.

Thus, it would be desirable to provide a tire pressure management system or rotary joint that includes one or more of the aforementioned advantages and overcomes the aforementioned difficulties. The present disclosure describes components and methods for allowing a tire pressure management system to be routed and attached to the wheel hub in ways other than on an axle.

SUMMARY

Described herein is a wheel end assembly for a tire pressure management system including an axle having an axle end portion and a rotary joint assembly disposed outboard of the axle end portion. The rotary joint has a rotary hub, a non-rotating tube spindle at least partially disposed within the rotary hub, the tube spindle having a tube spindle hollow central chamber, an air seal provided between the rotary hub and the tube spindle, and a bearing assembly provided between the rotary hub and the tube spindle. The bearing assembly is positioned outboard of the air seal.

In some embodiments, the wheel end assembly includes an annular dirt excluder disposed around a portion of the spindle and positioned outboard of the opening to prevent dirt from entering the rotary joint assembly and permit pressurized fluid to exit the rotary joint assembly.

Also, described herein is a rotary joint with a venting mechanism. The rotary joint has a rotary hub having a rotary hub inner surface, a non-rotating tube spindle at least partially disposed within the rotary hub, the tube spindle having a tube spindle hollow central chamber, an air seal provided between the rotary hub and the tube spindle. The rotary hub inner surface has a bearing chamber channel formed in the axial direction therein, and the bearing chamber channel is selectively in fluid communication with atmosphere.

BRIEF DESCRIPTION OF THE DRAWINGS

The above, as well as other advantages of the present disclosure, will become readily apparent to those skilled in, the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that a wheel end assembly with an external rotary joint and a rotary joint with a venting mechanism may be used in automotive, off-road vehicle, all-terrain vehicle, construction, and structural applications. As a non-limiting example, the present disclosure may be used in passenger vehicle, electric vehicle, hybrid vehicle, commercial vehicle, autonomous vehicles, semi-autonomous vehicles, and/or heavy vehicle applications. The present disclosure may also be used in an axle assembly of a tandem axle assembly, a tridem axle assembly, a single axle assembly, and/or an electric axle assembly.

Figure 1:
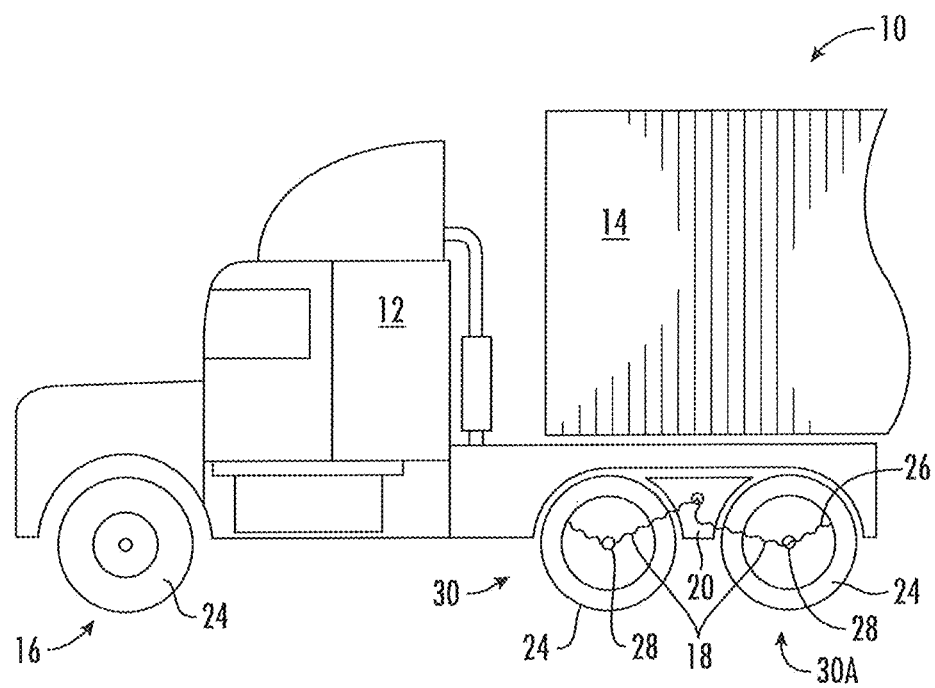
FIG. 1 is a schematic perspective view of a vehicle including a plurality of wheel end assemblies, wherein each of the wheel end assemblies has a tire pressure management system.

Referring to FIG. 1, FIG. 1 shows a schematic perspective view of a vehicle 10 including a plurality of wheel end assemblies, wherein each of the wheel end assemblies has a tire pressure management system 18 according to an embodiment of the disclosure. The system 18 is described herein with reference to a pressurized fluid, such as air. The system 18 may have inflate and/or deflate capability to allow a tire pressure to be increased and/or decreased.

The vehicle 10 may be a motor vehicle like a truck, a bus, farm equipment, a military transport or weaponry vehicle, or cargo loading equipment for land, air, or marine vessels, in the embodiment shown in FIG. 1, the vehicle 10 is configured as a truck and may include a tractor 12 and a trailer 14. The trailer 14 may be coupled to the tractor 12 and may be configured to receive cargo.

As best seen in FIG. 1 and as a non-limiting example, the tractor 12 has a steer axle wheel end assembly 16, a first drive axle wheel end assembly 30, and a second drive axle wheel end assembly 30A. Embodiments of the system 18 are preferably used with the first drive axle wheel end assembly 30 and the second drive axle wheel end assembly 30A. However, it should be appreciated that the system 18 may be used with the steer axle wheel end assembly 16, instead of the first drive axle wheel end assembly 30 and the second drive axle wheel end assembly 30A.

As best shown in FIG. 1, each of the first drive axle wheel end assembly 30 and the second drive axle wheel end assembly 30A is associated with a tire 24. Each tire 24 contains air at a certain pressure which will hereinafter be referred to as tire pressure. In an embodiment, the first drive axle wheel end assembly 30 and the second drive axle wheel end assembly 30A are similarly configured. Each of the first drive axle wheel end assembly 30 and the second drive axle wheel end assembly 30A includes a drive axle 32 and the steer axle wheel end assembly 16 includes a steer axle not shown), as shown in FIG. 9.

FIG. 1 also depicts a vehicle 10 with a fairing 20. The fairing 20 could be a serf bar or the like. In this embodiment, the system 18 is routed from the frame (not shown) of the vehicle 10 to the fairing 20 and then to the first drive axle wheel end assembly 30 and/or the second drive axle wheel end assembly 30A. Pressurized air may be routed using flexible air hoses 26 disposed on each of the first drive axle wheel end assembly 30 and the second drive axle wheel end assembly 30A.

Figure 9:
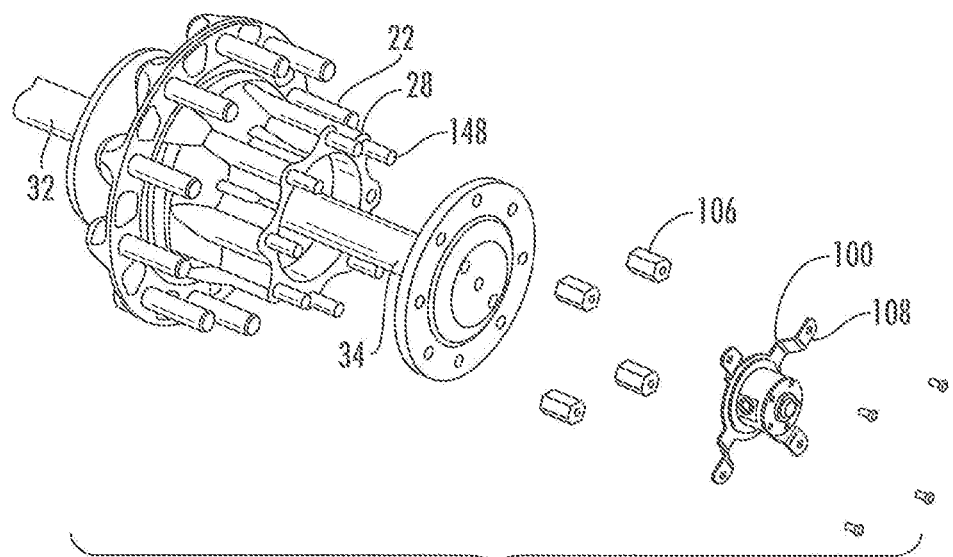
FIG. 9 is a schematic partially exploded view of the rotary joint assembly illustrated in FIGS. 2-6 incorporated into the wheel end assembly illustrated in FIG. 1.

As best shown in FIGS. 1 and 9, each of the first drive axle wheel end assembly 30 and the second drive axle wheel end assembly 30A includes a hub 28, wherein the hub 28 rotates with each of the drive axles, in an embodiment, each of the air hoses 26 and their respective connections to the first drive axle wheel end assembly 30 and the second drive axle wheel end assembly 30A do not rotate.

As best shown in FIGS. 2-9, each of the first drive axle wheel end assembly 30 and the second drive axle wheel end assembly 30A also includes a rotary joint assembly 100. In an embodiment, the respective rotary joint assembly 100 is disposed outboard of an axle end portion 34 of one of the drive axles 32, As such, the rotary joint assembly 100 is not integrated into the first drive axle wheel end assembly 30 or the second drive axle wheel end assembly 30A, but instead serves as an add-on assembly.

Figure 2:
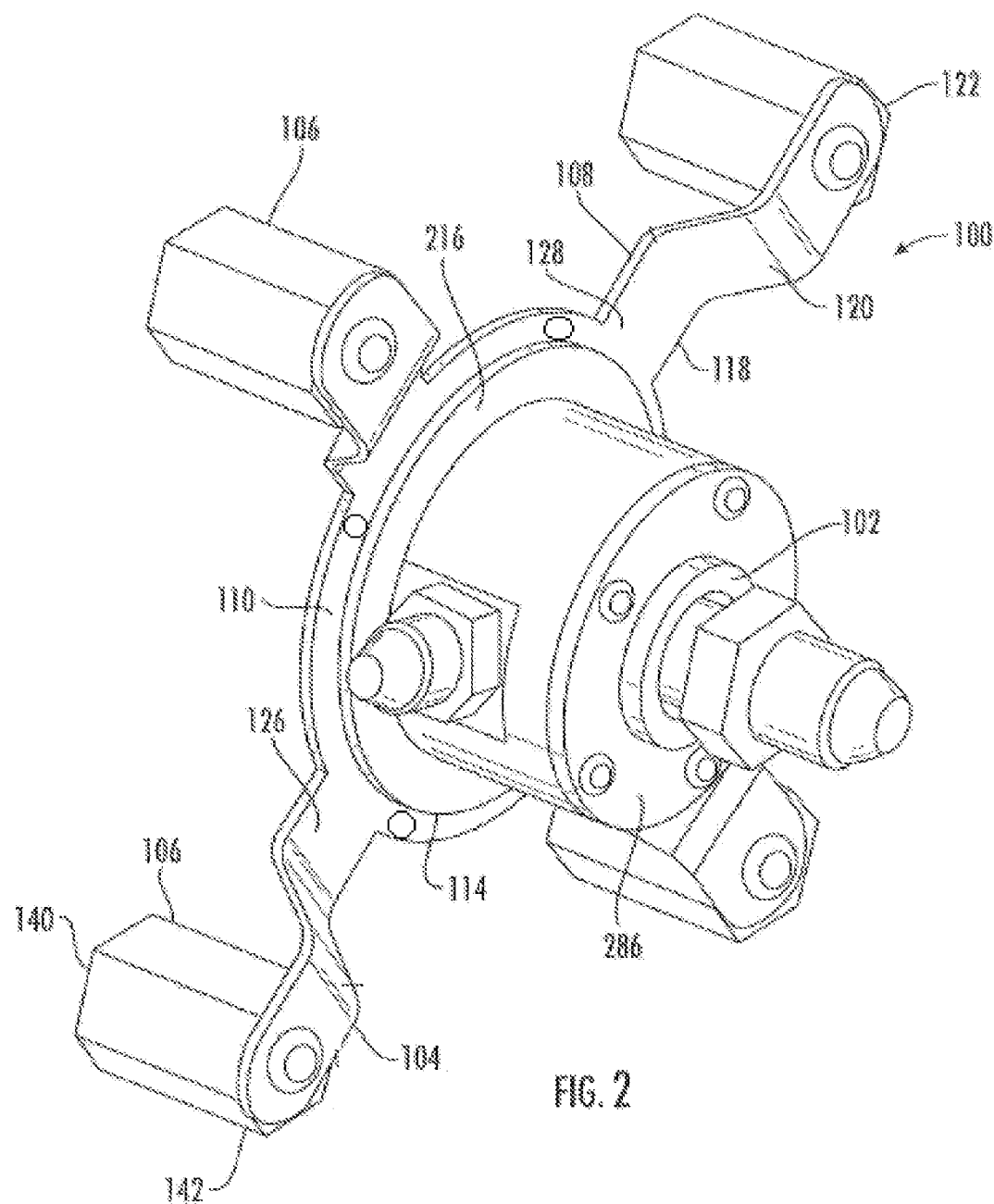
FIG. 2 is a schematic perspective view of a rotary joint assembly of a wheel end assembly illustrated in FIG. 1.
Figure 3:
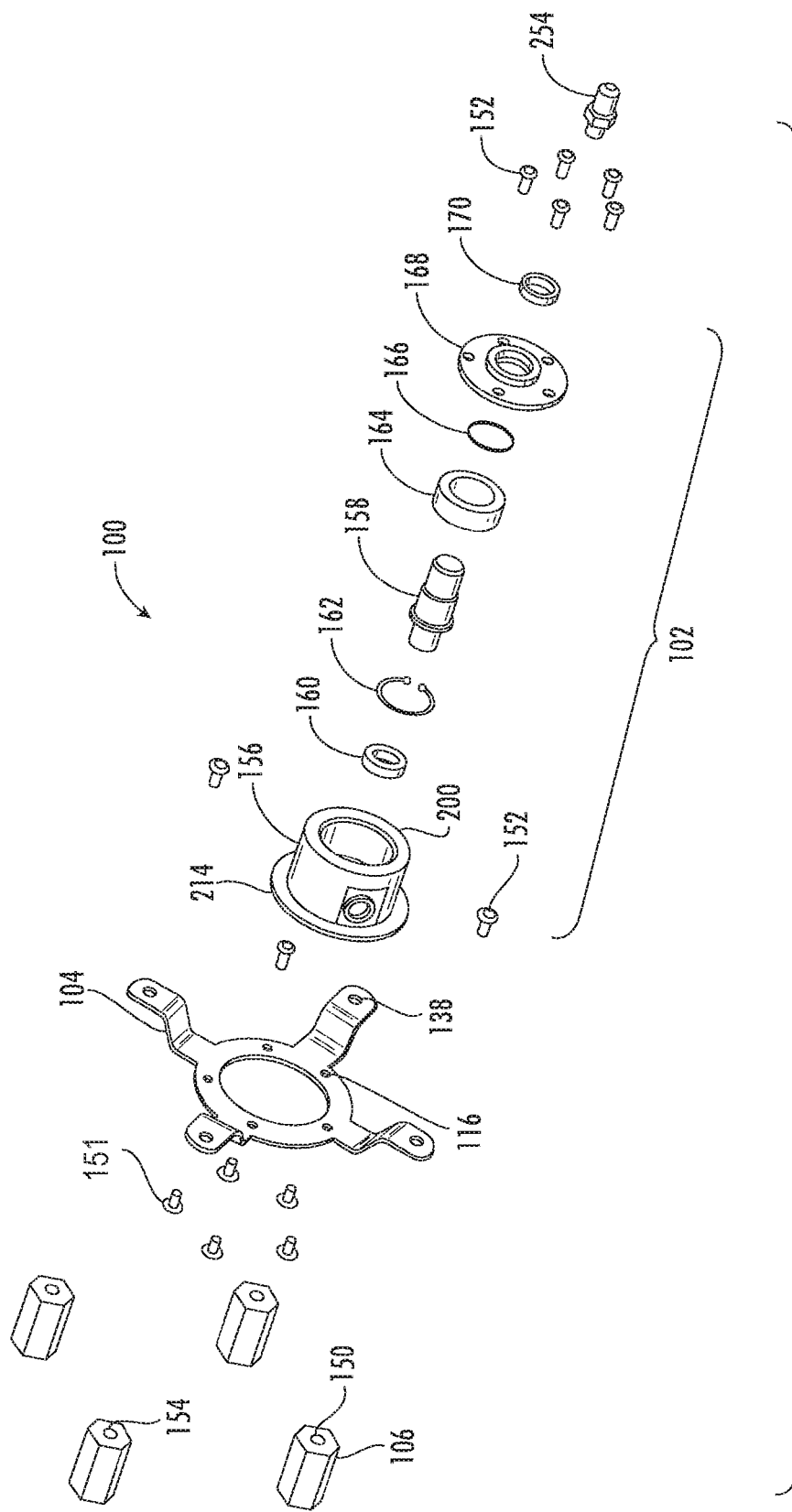
FIG. 3 is a schematic exploded view of the rotary joint assembly illustrated in FIG. 2.

As best shown in FIGS. 2 and 3 and as a non-limiting example, the rotary joint assembly 100 includes an external rotary joint 102, an attachment bracket 104, and a plurality of spacers 106. The rotary joint 102 allows for the coupling of various rotating members, such as the first drive axle wheel end assembly 30, the second drive axle wheel end assembly 30A, and the hubs 38 with various non-rotating members, such as the air hoses 26.

The attachment bracket 104 has a plurality of attachment bracket arms 108 radially spaced around an attachment bracket center ring 110. The attachment bracket center ring 110 may be an annular disk with an inboard attachment bracket center ring surface 112 and an outboard attachment bracket center ring surface 114. The attachment bracket center ring 110 may have a plurality of attachment bracket center ring apertures 116 extending therethrough.

In the embodiment shown in FIG. 2, each attachment bracket arm 108 has a proximal portion 118 disposed adjacent to an end of the attachment bracket center ring 110, an end portion 112, and a step portion 120 interposed between the proximal portion 118 and the end portion 112. Each attachment bracket arm 108 has an inboard surface 124 and an outboard surface 126.

In an embodiment, the proximal portion 118 is attached at a first proximal portion end 128 to the attachment bracket center ring 110. The attachment bracket arm proximal portion 118 may be unitary with the attachment bracket center ring 110 or may be attached by other conventional means. The attachment arm proximal portion 118 extends radially outward from the attachment bracket center ring 110.

In an embodiment, the step portion 120 may be unitary with the proximal portion 118 or may be attached by other conventional means. Similarly, the end portion 122 may be unitary with the step portion 120 or may be attached by other conventional means. The step portion 120 projects radially and axially outward from the proximal portion 118 such that the step portion 120 may intersect the proximal portion 118 at an angle greater than 90 degrees. Similarly, the step portion 120 also intersects the end portion 122 at an angle greater than 90 degrees such that the end portion 122 projects radially outward horn the step portion 120. In some embodiments, each end portion 122 may have an end portion aperture 138 extending therethrough, as shown in FIG. 3.

Figure 7:
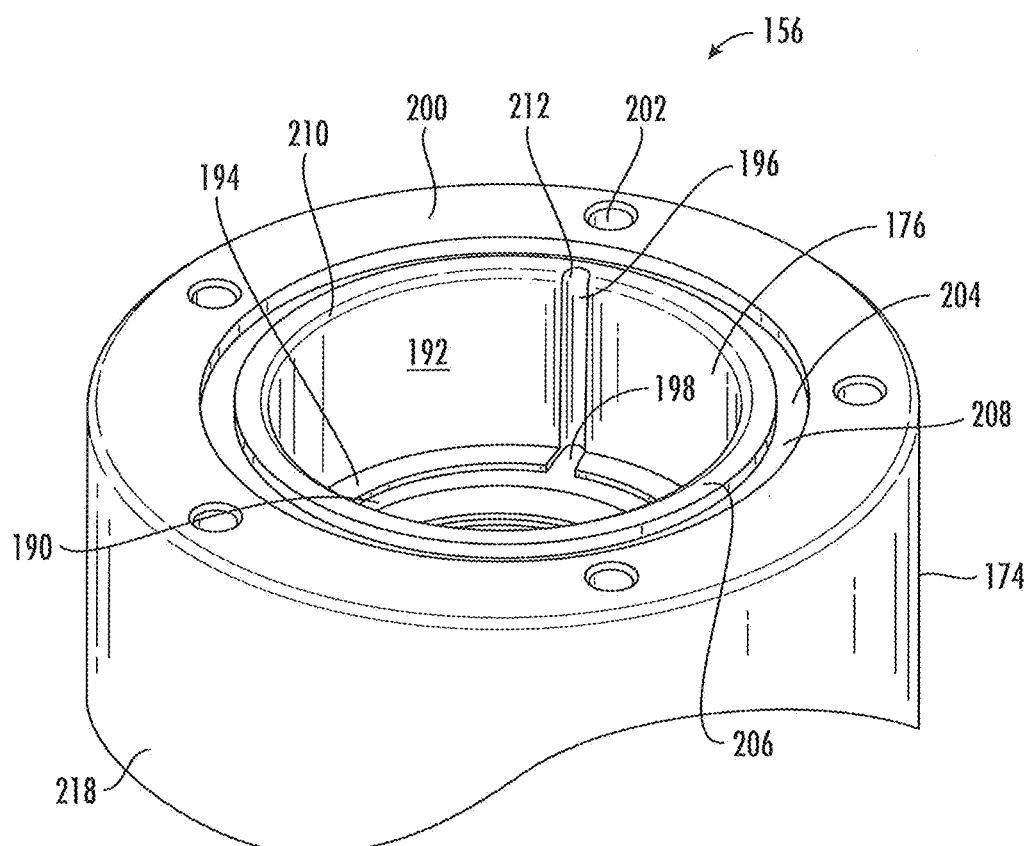
FIG. 7 is a schematic top perspective view of the rotary hub of the rotary joint assembly illustrated in FIGS. 2-6.

As best shown in FIGS. 3 and 7 and as a non-limiting example, the rotary joint 102 includes a rotary hub 156, a tube spindle 158, an air seal 160, a snap ring 162, a bearing assembly 164, a bearing retainer ring 166, a bearing cap 168, a dirt excluder 170, one or more fasteners 151, 152, and one or more hose fittings 254. In some embodiments, the rotary joint 102 also includes an O-ring (not shown).

Figure 5:
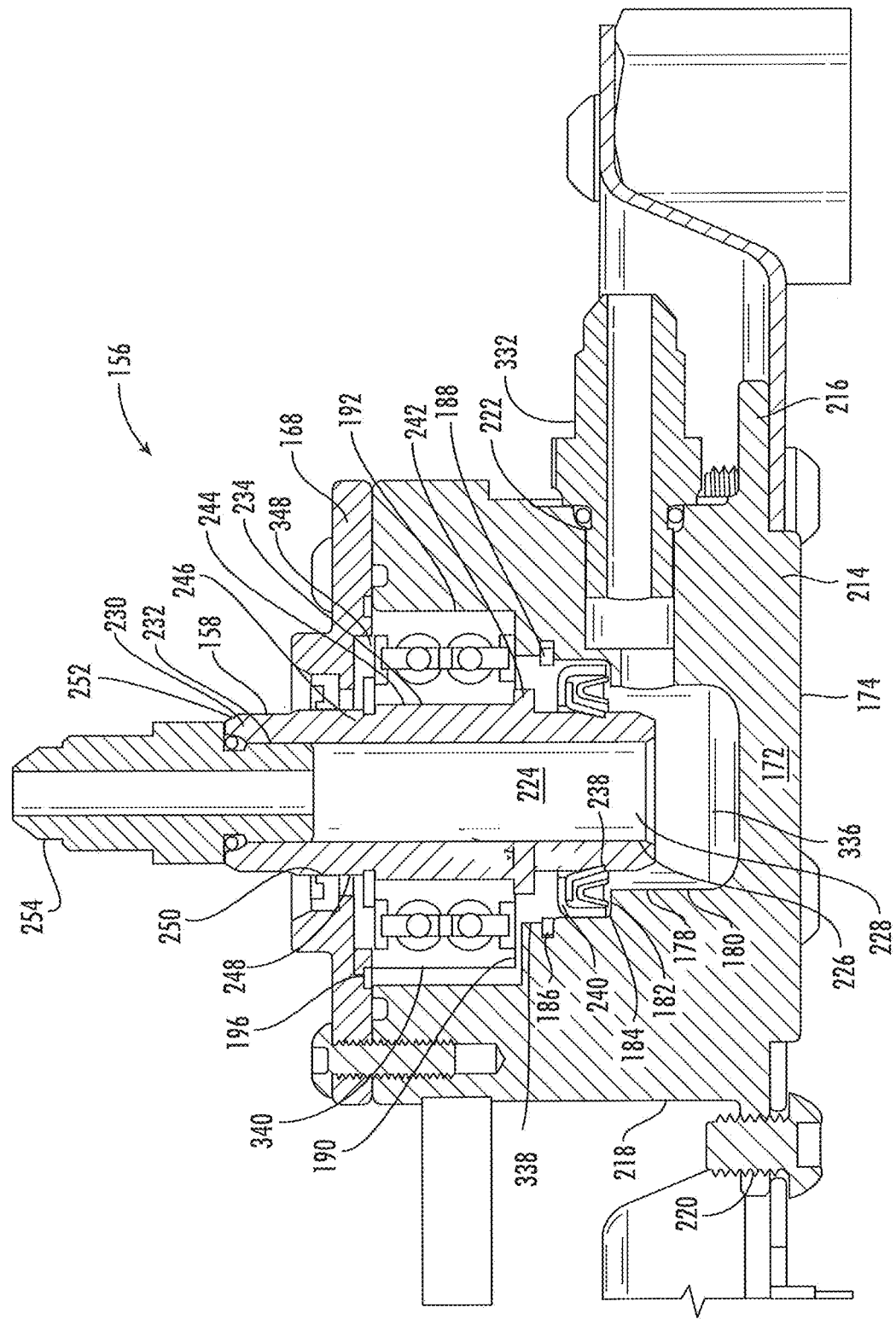
FIG. 5 is a schematic cross-sectional view of a rotary hub of the rotary joint assembly illustrated in FIGS. 2 and 3.

In the embodiment shown in FIGS. 3 and 5, the rotary hub 156 is cup shaped. One of ordinary skill in the art would understand that the rotary hub 156 may also comprise other configurations. The rotary hub 156 has a rotary hub base 172, where the rotary hub base 172 is inboard and perpendicular to a rotary hub wall 174. In some embodiments, the rotary hub wall 174 is curved so as to form a cylinder-type shape. The rotary hub base 172 and rotary hub wall 174 together create the rotary hub hollow central chamber 176. The rotary hub wall 174 may have different a thicknesses along its axial dimension to accommodate various internal components in the rotary hub hollow central chamber 176.

Figure 4:
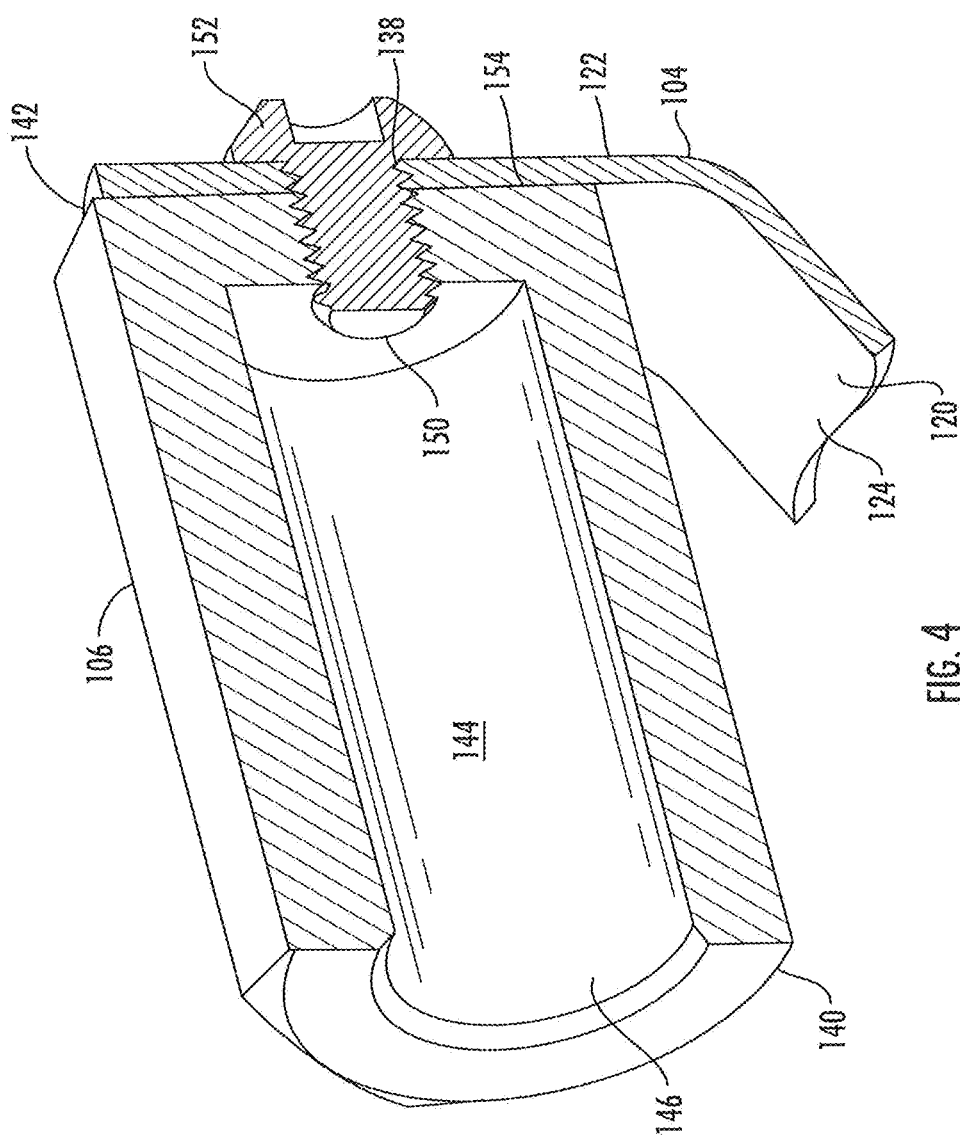
FIG. 4 is a schematic cross-sectional view of a portion of the rotary joint assembly illustrated in FIGS. 2 and 3.
Figure 10:
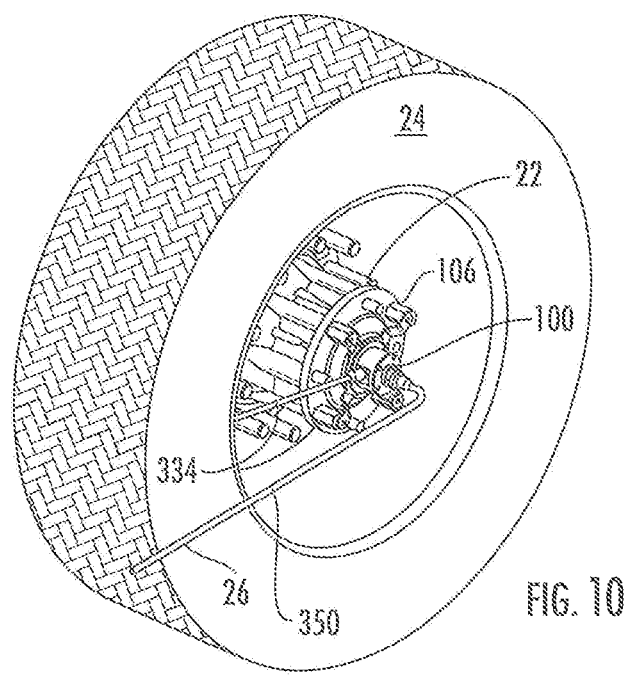
FIG. 10 is a schematic perspective view of a tire with the wheel end assembly illustrated in FIGS. 1 and 9.

As best shown in FIG. 4, each spacer 106 has a spacer first end 140, an opposing spacer second end 142, and a spacer central bore 144 interposed between the spacer first end 140 and the spacer second end 142. In an embodiment, the spacer first end 140 has a spacer first end opening 146 that has a size and shape such that the spacer first end opening 146 may be configured to fit over an axle stud 148, as shown in FIGS. 9 and 10.

The spacer second end 142 has a spacer second end opening 150 having a size and shape such that the spacer second end opening 150 may be configured to receive a fastener 152. An outer face 154 of the spacer second end 142 may be flat or otherwise formed to provide a meeting surface with the inboard surface 124 at an end portion 122 of one of the attachment bracket arms 108. As best shown in FIG. 4 and as a non-limiting example, the fastener 152 fastens the spacer 106 with one of the attachment bracket arms 108.

Figure 6:
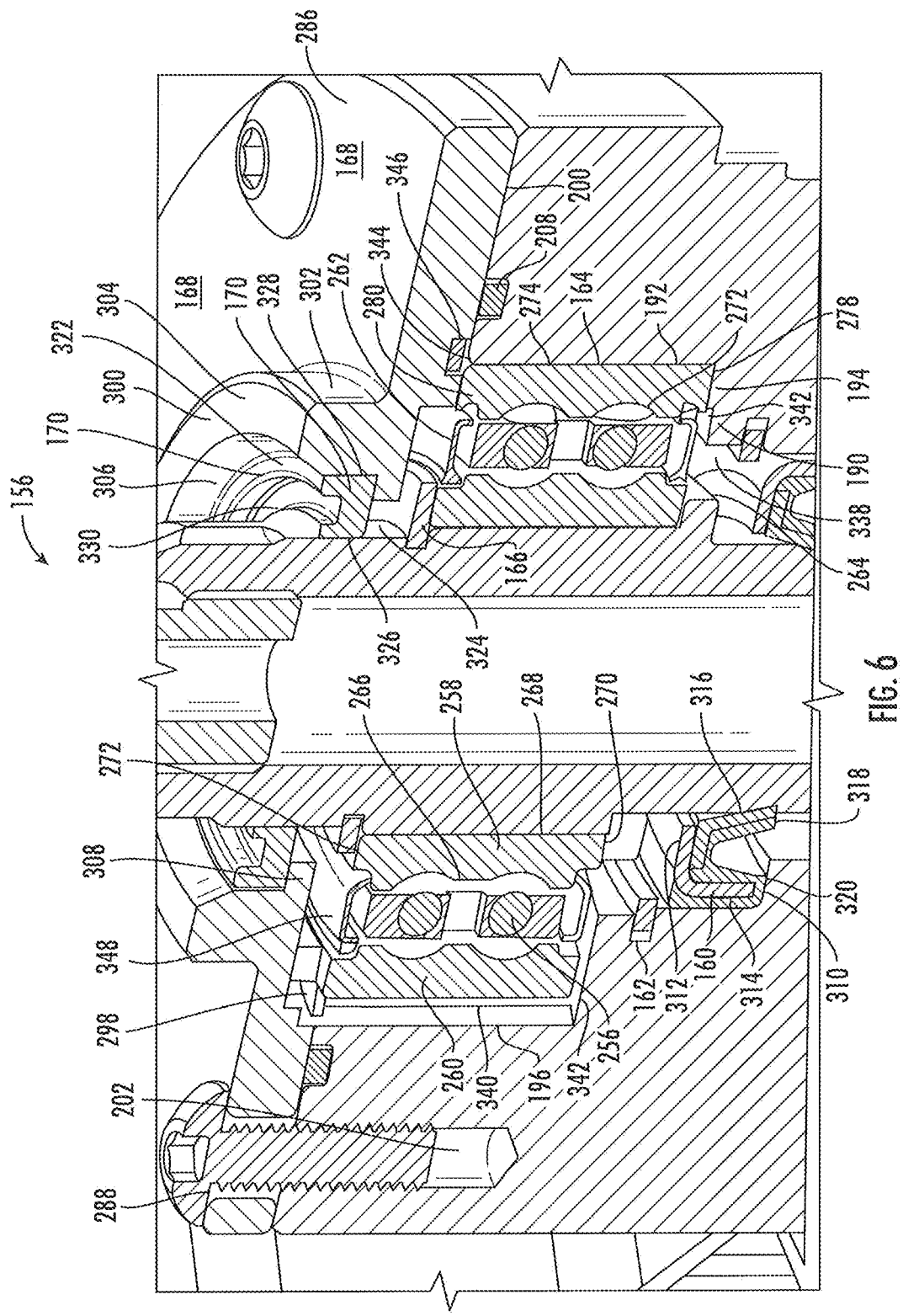
FIG. 6 is a schematic detail view of portion of the rotary hub of the rotary joint assembly illustrated in FIG. 5.

In the embodiment shown in FIGS. 5 and 6, the rotary hub 156 has an inner surface 178 that includes a rotary hub air chamber wall 180 extending axially outboard from the rotary hub base 172. The rotary hub inner surface 178 extends radially outward from the rotary hub air chamber wall 180, thereby forming an air seal surface 182 and/or an air seal wall 184. Also, the rotary hub inner surface 178 extends radially outward from the air seal wall 184 and then radially inward to form a rotary hub snap ring groove 186.

In an embodiment, the rotary hub inner surface 178 extends axially outboard from the rotary hub snap ring groove 186 to form a secondary chamber wall 188. The rotary hub inner surface 178 extends axially outboard from the secondary chamber wall 188 to form a bearing surface 190 and then the rotary hub inner surface 178 extends axially outboard from the bearing surface 190 to form a rotary hub bearing chamber wall 192.

As best seen in FIG. 6 and as a non-limiting example, the bearing surface 190 has an annular step-up ring 194 formed thereon wherein the bearing surface 190 and the rotary hub bearing chamber wall 192 meet. The rotary hub bearing chamber wall 192 may have a bearing chamber channel 196 formed therein running axially the length of the rotary hub bearing chamber wall 192, including through the annular step-up ring 194, such that the annular step-up ring 194 has a channel space 198 and does not form a complete circle around the annular shape of the bearing surface 190, as shown specifically in FIG. 7.

As best seen in FIG. 7 and as a non-limiting example, extending radially outward from the rotary hub bearing chamber wall 192 and the rotary hub inner surface 178 is the rotary hub outboard face 200. The bearing chamber channel 196 extends into the rotary hub outboard face 200 at a point where the rotary hub outboard face 200 meets the rotary hub bearing chamber wall 192. In some embodiments, the rotary hub outboard face 200 is perpendicular to the rotary hub bearing chamber wall 192. The rotary hub outboard face 200 is an annular surface with a plurality of rotary huh outboard face apertures 202.

As best shown in FIG. 7 and as a non-limiting example, a rotary hub outboard face valley 204 is disposed radially inward from the rotary hub outboard face apertures 202. Within the rotary hub outboard face valley 204 rises a rotary hub outboard face flow path ring 206. The rotary hub outboard face flow path ring 206 divides the rotary hub outboard face valley 204 into two portions: (1) an outer rotary hub outboard face valley portion 208 which is radially outward from the rotary hub outboard face flow path ring 206 and (2) an inner rotary hub outboard face valley portion 210 which is radially inward from the rotary hub outboard face flow path ring 206. In an embodiment, the outer rotary hub outboard face valley portion 208 may be an O-ring groove for receiving an O-ring therein.

As best shown in FIG. 7 and as a non-limiting example, the inner rotary hub outboard face valley portion 210 is adjacent to the rotary hub hollow central chamber 176. In some embodiments, the inner rotary hub outward face valley portion 210 has a divot 212. The divot 212 extends only partially into the rotary hub outboard face flow path ring 206, such that the rotary hub outboard face flow path ring 206 forms a complete circle around the annular shape of the rotary hub outboard face 200, but the inner rotary hub outward face valley portion 210 does not. The divot 212 is the outboard most portion of the bearing chamber channel 196.

As best shown in FIG. 5, on an inboard rotary hub end 214, the rotary hub 15 may have a rotary hub base flange 216 that protrudes perpendicularly and radially outward from a rotary hub outer surface 218. In some embodiments, the rotary hub base flange 216 has rotary hub base flange apertures 220. The rotary hub outer surface 218 may include a rotary hub fluid conduit port 222 configured to penetrate the rotary hub wall 174 to provide access to the rotary hub hollow central chamber 176.

As best shown in FIGS. 5 and 6 and as a non-limiting example, the tube spindle 158 includes a hollow tube with a tube spindle hollow central chamber 224, a tube spindle first end 226 having a tube spindle first opening 228 and a tube spindle second end 230 having a tube spindle second opening 232. The tube spindle first opening 228 and tube spindle second opening 232 are in fluid communication with the tube spindle hollow central chamber 224 and each other.

In an embodiment, the tube spindle outer surface 234 may have a tube spindle an chamber outer surface 236, wherein, the tube spindle outer surface 234 extends axially outboard from the tube spindle air chamber outer surface 236 to form a tube spindle air seal notch 238. The tube spindle outer surface 234 may extend axially outboard from the tube spindle air seal notch 238 to form a tube spindle secondary chamber surface 240 and may extend radially outward from the tube spindle secondary chamber surface 240 to form a tube spindle bearing flange 242 having a bearing flange thickness. The tube spindle outer surface 234 may also extends axially outboard from the tube spindle bearing flange 242 to form a tube spindle bearing, chamber wall 244 and may extend axially outboard from to the tube spindle bearing chamber wall 244 to form a bearing retainer ring notch 246. Further, the tube spindle outer surface 234 may extend axially outboard from the bearing, retainer ring notch 246 to form a tube spindle air escape space wall 248 and may extend axially outboard from the tube spindle air escape space wall 248 to form a tube spindle dirt excluder surface 250. Lastly, the tube spindle outer surface 234 may extend axially outboard from the tube spindle dirt excluder surface 250 to form a tube spindle end section 252, which may be shaped to accommodate an inflow fluid connector 254.

In the embodiment shown in FIGS. 5 and 6, the bearing assembly 164 has an inner race 258, an outer race 260, bearings 256, an upper bearing seal 262, and a lower bearing seal 264. The inner race 258 has an inner race outer surface 266, an inner race inner surface 268, an inner race inboard surface 270, and an inner race outboard surface 272. The outer race 260 has an outer race outer surface 274, an outer race inner surface 276, an outer race inboard surface 278, and an outer race outboard surface 280.

Figure 8:
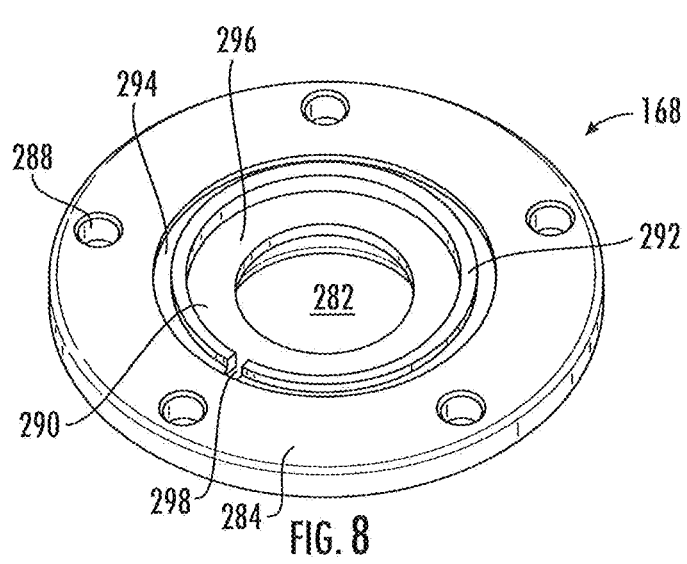
FIG. 8 is a schematic bottom perspective view of a bearing cap of the rotary joint assembly illustrated in FIGS. 2-6.

As best shown in FIGS. 5, 6, and 8 and as a non-limiting example, the bearing cap 168 is an annular ring including a bearing cap central bore 282, a first bearing cap surface 284, a second bearing cap surface 286, and a plurality of bearing cap apertures 288 through the bearing cap 168 for receiving fasteners 151. On the first bearing cap surface 284 is a bearing cap valley 290, radially inward from the bearing cap apertures 288. Within the bearing cap valley 290 rises a bearing cap flow path ring 292. The bearing cap flow path ring 292 divides the bearing cap valley 290 into two portions: (1) an outer bearing cap valley portion 294 which is radially outward from the bearing cap flow path ring 292 and (2) an inner bearing cap valley portion 296 which is radially inward from the bearing cap flow path ring 292. The inner bearing cap valley portion 296 is adjacent to the bearing cap central bore 282. The bearing cap flow path ring 292 does not form a complete circle around the annular ring shape of the bearing cap 168 due to a break 298 in the bearing cap flow path ring 292.

As best shown in FIG. 6, on the second bearing cap surface 286 is a bearing cap protrusion 300 radially inward from the bearing cap apertures 288. The bearing cap protrusion 300 is an annular ring that extends axially outboard from the second bearing cap surface 286. The bearing cap protrusion 300 has a radially outward protrusion surface 302, which is perpendicular to the second bearing cap surface 286. The bearing cap protrusion 300 has an external protrusion surface 304, which is parallel to the second bearing cap surface 286 and perpendicular to the radially outward protrusion surface 302. In addition, the bearing cap protrusion 300 has a radially inward protrusion surface 306 which is perpendicular to the external protrusion surface 304 and parallel to the radially outward protrusion surface 302. Lastly, radially inward from the bearing cap protrusion 300, is a bearing cap ledge 308. The bearing cap ledge 308 is perpendicular to and abutting the radially inward protrusion surface 306 and parallel to the second bearing cap surface 286, The bearing cap ledge 308 is adjacent to the bearing cap central bore 282.

In an embodiment, the air seal 160 is annular and has an air seal inboard surface 310, an air seal outboard surface 312, an air seal radial outer surface 314, and an air seal radial inner surface 316. The air seal 160 may have other features known in the art, such as an air seal inboard surface 310 that is cleaved into an inner air seal inboard surface 318 and an outer air seal inboard surface 320.

As best shown in FIG. 6, the dirt excluder 170 is an annular ring of a general torus shape with a dirt excluder outboard surface 322, a dirt excluder inboard surface 324, a dirt excluder inner surface 326, and a dirt excluder outer surface 328, The dirt excluder outboard surface 322 may have a dirt excluder channel 330 formed therein. The dirt excluder 170 may be used to stop water and debris from entering the rotary joint 102 and to allow for venting if the air seal 160 does not function as intended while maintaining the exclusion of dirt and debris to the atmosphere.

As best shown in FIG. 6, the rotary joint assembly 100 may also include a snap ring 162, a bearing retainer ring 166, an upper bearing seal 262, fasteners 151, 152, and hose fittings 254.

As best shown in FIG. 9, the spacer 106 is configured to attach to an axle stud 148 via the spacer first end opening 146 during assembly of the rotary joint assembly 100 into one of the first drive axle wheel end assembly 30 or the second drive axle wheel end assembly 30A. As best shown in FIG. 4, the spacer second end opening 150 abuts the attachment bracket arm end portion 122 on the inboard attachment bracket arm surface 124. The spacer second end opening 150 and the attachment bracket arm end portion aperture 138 align for receiving a fastener 152 therein.

As best shown in FIG. 5 and as a non-limiting example, the outboard attachment bracket center ring surface 114 abuts the rotary hub base flange 216. The attachment bracket center ring apertures 116 and the rotary hub base flange apertures 220 align for receiving a fastener 151 therethrough. The above-described arrangement accommodates the length of the spacer 106 while allowing for the rotary joint 102 to not protrude unnecessarily far outboard from the hub 28.

In an embodiment, the rotary hub fluid conduit port 222 in the rotary hub 156 is able to receive an outflow fluid connector 332 allowing attachment of an outflow fluid conduit 334 to the rotary hub 154. In some embodiments, the outflow fluid conduit 334 may also connect to one of the tires 24. In one specific embodiment, the outflow fluid connector 332 will be a pressurized air hose fitting and the outflow fluid conduit 334 will be a pressurized air hose.

In an embodiment, the air seal 160 resides in the rotary hub hollow chamber 176. The inner air seal inboard surface 318 resides in the tube spindle air seal notch 238. The outer air seal inboard surface 320 rests on the air seal surface 182 of the rotary hub 156. The air seal radial outer 314 surface abuts the air seal wall 184 of the rotary hub 156.

With the air seal 160 in place, an air chamber 336 may be formed between the rotary hub base 172, rotary hub wall 174, rotary hub fluid conduit port 222, air seal inboard surface 310, tube spindle first opening 228, and tube spindle air chamber outer surface 236. The air chamber 336 is in fluid communication with both the tube spindle hollow central chamber 224 and the rotary hub fluid conduit port 222.

As best shown in FIG. 6 and as a non-limiting example, the bearing assembly 164 resides in a bearing chamber 340. The bearing chamber 340 is formed by the tube spindle bearing flange 242, bearing surface 190 of the rotary bib 156, annular step-up ring 194 of the rotary hub 156, the rotary hub bearing chamber wall 192, the bearing retainer ring 166, the tube spindle bearing chamber wall 244, and the bearing cap 168. The inner race inboard surface 270 rests on the tube spindle bearing flange 242 and abuts the bearing retainer ring 166 and the tube spindle bearing chamber wall 244.

As best shown in FIG. and as a non-limiting example, the inner race outer surface 266 contacts the bearings 256. The outer race inboard surface 278 rests on the annular step-up ring 194 of the rotary hub 156, except where the channel space 198 is present. Because the outer race inboard surface 278 rests on the annular step-up ring 194, the lower bearing seal 264 and outer race 260 are separated from the bearing surface 190, thereby forming an air escape passage 342 therebetween. The outer race outboard surface 280 abuts the bearing cap 168, specifically the bearing cap flow path ring 292, except where the break 298 in the bearing cap flow path ring 292 is present. The outer race outer surface 274 abuts the rotary hub hearing chamber wall 192, except where the bearing chamber channel 196 is present. The outer race inner surface 276 contacts the bearings 256.

As best shown in FIGS. 5 and 6, the bearing cap 168 may rest on the rotary hub outboard face 200 such that any given rotary hub outboard face aperture 202 and a given bearing cap aperture 288 align and can receive a fastener 151. The first bearing cap surface 284 contacts the rotary hub outboard face 200 and O-ring (not shown) residing in the outer rotary hub outboard face valley portion 208 (i.e. O-ring groove) therein. The bearing cap flow path ring 292 abuts the outer race outboard surface 280. The outer bearing cap valley portion 294 straddles the contact point 344 of the outer race outer surface 274 and the rotary hub bearing chamber wall 192, thereby creating an air flow path 346 therein. The inner bearing cap valley portion 296 extends over, but does not contact, the bearing assembly 164, thereby creating an air escape space 348 therebetween. Thus, the air escape space 348 is formed between the upper bearing seal 262, the bearing cap flow path ring 292, the inner bearing cap valley portion 296, the bearing retainer ring 166 residing in the bearing retainer ring notch 246, the tube spindle air escape space wall 248, and the dirt excluder inboard surface 324.

The secondary chamber 338, the air escape passage 342, the channel space 198 of the annular step-up ring 194, the bearing chamber channel 194, the divot 212 in the inner rotary hub outward face valley portion 210, the air flow path 346, the break 298 in the bearing cap flow path ring 292, and the air escape space 348 are all in fluid communication with one another and form a venting mechanism.

In an embodiment, the tube spindle second opening 232 is designed to receive an inflow fluid connector 254 to enable fluid communication from the tire pressure management system to the tube spindle 158 and beyond via an inflow fluid conduit 350. In one specific embodiment, the inflow fluid connector 254 will be a pressurized air hose fitting and the inflow fluid conduit 350 will be a pressurized air hose.

As shown in the figures of the present disclosure, the rotary hub 156 attaches to the wheel end assembly 22 and will rotate relative to the tube spindle 158, the inflow fluid connector 254, the inflow fluid conduit 350, the bearing retainer ring 166, and the inner race 258 while the vehicle 10 is in motion. The dirt excluder 170 and the air seal 160 are designed to withstand a high number of high speed revolutions during their lifespan.

For use of the described rotary joint 102 with the system 10, pressurized air may be provided from a central supply line (not shown) to the inflow fluid conduit 350. Pressurized air or other fluid then passes into the tube spindle hollow central chamber 224 via the inflow fluid connector 254 into the air chamber 336 of the rotary hub 156 and through the rotary hub conduit port 222, outflow fluid connector 332, and outflow fluid conduit 334 to the tire 24 as necessary.

Under normal operating conditions, the venting mechanism is not in fluid flow communication with the air chamber 336, the rotary hub conduit port 222, or the tube spindle hollow central chamber 224. However, if pressurized air escapes beyond the air seal 160, the escaped air can find a way to atmosphere without going through the bearing assembly 164. In other words, if pressurized air moves past the air seal 160 into the secondary chamber 338, the air may travel through the air escape passage 342, the channel space 198 of the annular step-up ring 194, the bearing chamber channel 196, the divot 212 in the inner rotary hub outward face valley portion 210, the air flow path 346, the break 298 in the hearing cap flow path ring 292, and the air escape space 348, past the dirt excluder 170 to atmosphere.

In an alternative embodiment, the venting mechanism does not comprise the air escape passage 342, the channel space 198 of the annular step-up ring 194, the bearing chamber channel 196, the divot 212 in the inner rotary hub outward face valley portion 210, or the air flow path 346. Instead, the air that escapes past the air seal 160 travels around or through the bearing assembly 164 into the air flow path 346, through the break 298 in the bearing cap flow path ring 292, through the an escape space 348 and past the dirt excluder 170 to atmosphere.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A wheel end assembly for a tire pressure management system, comprising:
    an axle having an axle end portion; and
    a rotary joint assembly disposed outboard of the axle end portion, the rotary joint assembly comprising:
    (i) a rotary hub,
    (ii) a non-rotating spindle at least partially disposed within the rotary hub, the spindle having a first fluid conduit extending therethrough,
    (iii) a rotary air seal disposed between the rotary hub and the spindle, and
    (iv) a bearing assembly provided between the rotary hub and the spindle, the bearing assembly being positioned outboard of the rotary air seal,
    wherein the rotary hub is coupled to the axle for rotation therewith.

2. The wheel end assembly of claim 1, wherein the first fluid conduit has a first end in fluid communication with a port disposed in the rotary hub.

3. The wheel end assembly of claim 2, wherein the port includes a first diameter portion and a second diameter portion, and the spindle extends through the first diameter portion and into the second diameter portion.

4. The wheel end assembly of claim 1, wherein the rotary hub includes a first portion coupled to a second portion, the first portion being positioned outboard of the second portion and including an inner wall portion that defines an opening and that is spaced apart from the spindle.

5. The wheel end assembly of claim 1, wherein the rotary air seal is attached to one of the rotary hub and the spindle and the rotary air seal is in sealing contact with one of the rotary hub and the spindle.

6. The wheel end assembly of claim 3, wherein the bearing assembly is disposed in the first diameter portion and the rotary air seal is disposed in the second diameter portion.

7. The wheel end assembly of claim 1, wherein the spindle includes an inlet for receiving pressurized fluid from a second fluid conduit, wherein the rotary joint assembly permits the axle end portion to rotate with respect to the second fluid conduit.

8. The wheel end assembly of claim 4, further comprising an annular dirt excluder disposed around a portion of the spindle and positioned outboard of the opening to prevent dirt from entering the rotary joint assembly and to permit pressurized fluid to exit the rotary joint assembly.

9. The wheel end assembly of claim 7, wherein the second fluid conduit is in fluid communication with a source of pressurized fluid and extends from a support member, the support member being positioned outboard of the second fluid conduit or between a pair of wheel assemblies.

10. The wheel end assembly of claim 9, wherein the support member is a fairing.

11. The wheel end assembly of claim 7, wherein the second fluid conduit is positioned outboard of the rotary joint assembly.

12. The wheel end assembly of claim 1, further comprising an annular bearing cap disposed on an outboard face of the rotary hub.

13. A rotary joint assembly with a venting mechanism, the rotary joint assembly comprising:
- a rotary hub having a rotary hub inner surface;
- a non-rotating spindle at least partially disposed within the rotary hub, the spindle having a first fluid conduit extending therethrough;
- a rotary air seal provided between the rotary hub and the spindle; and
- a bearing assembly provided between the rotary hub and the spindle,
- wherein the rotary hub inner surface has a bearing channel formed in the axial direction therein, and wherein the bearing channel is selectively in fluid communication with atmosphere, and
- wherein the spindle includes an inlet for receiving pressurized fluid from a second fluid conduit, wherein the rotary joint assembly permits an axle end portion of an axle to rotate with respect to the second fluid conduit.

14. The rotary joint assembly of claim 13, wherein the spindle includes an opening configured to receive a pressurized air hose fitting.

* * * * *